United States Patent
Kasami et al.

(10) Patent No.: US 10,837,552 B2
(45) Date of Patent: Nov. 17, 2020

(54) PARKING LOCK DEVICE

(71) Applicant: SUBARU CORPORATION, Tokyo (JP)

(72) Inventors: Seiya Kasami, Tokyo (JP); Taichi Tsuji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/460,374

(22) Filed: Jul. 2, 2019

(65) Prior Publication Data
US 2020/0096102 A1    Mar. 26, 2020

(30) Foreign Application Priority Data
Sep. 21, 2018   (JP) .................................. 2018-177209

(51) Int. Cl.
*F16H 63/34*   (2006.01)
*F16H 59/44*   (2006.01)

(52) U.S. Cl.
CPC ......... *F16H 63/3483* (2013.01); *F16H 59/44* (2013.01); *F16H 63/3475* (2013.01); *F16H 63/3491* (2013.01)

(58) Field of Classification Search
None
See application file for complete search history.

(56) References Cited

U.S. PATENT DOCUMENTS

| | | | |
|---|---|---|---|
| 2002/0084149 A1* | 7/2002 | Heuver | F16H 63/483 188/69 |
| 2008/0236967 A1 | 10/2008 | Mayr | |
| 2016/0082933 A1 | 3/2016 | Iwata et al. | |
| 2016/0091037 A1 | 3/2016 | Iwata et al. | |

(Continued)

FOREIGN PATENT DOCUMENTS

| | | |
|---|---|---|
| JP | 2008-128444 A | 6/2008 |
| JP | 2009-520163 A | 5/2009 |

(Continued)

OTHER PUBLICATIONS

Notification of Reasons for Refusal issued in corresponding Japanese Patent Application No. 2018-177209 dated Mar. 10, 2020, with machine translation.

*Primary Examiner* — Timothy Hannon
(74) *Attorney, Agent, or Firm* — Troutman Pepper Hamilton Sanders LLP

(57) ABSTRACT

A parking lock device includes a parking mechanism, a lock state switching member, a lock-released state keeper, a selector, a vehicle speed detector, a switching controller, and a keeping controller. The switching controller is configured to, when a parking range is selected, stop supplying hydraulic pressure to the lock state switching member, and when a shift range other than the parking range is selected, supply the hydraulic pressure. The keeping controller is configured to, when a shift range other than the parking range is selected and a vehicle speed is equal to or higher than a predetermined speed, supply power to the lock-released state keeper (Continued)

to keep lock of a parking gear released, and when a shift range other than the parking range is selected and when the vehicle speed is lower than the predetermined speed, stop supplying the power to the lock-released state keeper.

6 Claims, 2 Drawing Sheets

(56) References Cited

U.S. PATENT DOCUMENTS

| | | |
|---|---|---|
| 2016/0123412 A1 | 5/2016 | Iwata et al. |
| 2016/0208916 A1 | 7/2016 | Kokubu et al. |
| 2018/0100581 A1* | 4/2018 | Neelakantan ....... F16H 63/3466 |
| 2019/0032780 A1* | 1/2019 | Kinch ................. F16H 63/3483 |
| 2019/0186629 A1* | 6/2019 | Kawaguchi ............ F16H 61/12 |

FOREIGN PATENT DOCUMENTS

| | | | |
|---|---|---|---|
| JP | 2009-257093 A | 11/2009 | |
| JP | 2016-78805 A | 5/2016 | |
| WO | 2014/203898 A1 | 12/2014 | |

* cited by examiner

PARKING LOCK DEVICE

CROSS-REFERENCE TO RELATED APPLICATIONS

The present application claims priority from Japanese Patent Application No. 2018-177209 filed on Sep. 21, 2018, the entire contents of which are hereby incorporated by reference.

BACKGROUND

The disclosure relates to parking lock devices and, in particular, to a parking lock device of an automatic transmission employing a hydraulic shift-by-wire mechanism.

An automatic transmission of the related art includes a parking lock mechanism to lock a parking gear engaged with an output shaft of the automatic transmission when a parking (P) range is selected. Recently, automatic transmissions including shift-by-wire (SBW) mechanisms have been put into practical use. The SBW mechanism detects a shift range selected by a driver using an element such as a switch, and drives a hydraulic actuator, for example, based on a result of the detection to switch a shift range of the automatic transmission.

In the hydraulic shift-by-wire mechanism (a parking lock mechanism employing a hydraulic actuator), when the P range is selected, for example, supply of hydraulic pressure is stopped to swing a parking pawl to lock the parking gear. When any of the shift ranges other than the P range is selected, hydraulic pressure is supplied to release lock of the parking gear. An engine stall, for example, may cause the hydraulic pressure to decrease to lock the parking gear even when a driver does not intend to (for example, during travel). In view of this, a mechanism has been proposed to drive an electromagnetic solenoid while the supplied hydraulic pressure is releasing lock of the parking gear so that the electromagnetic solenoid keeps lock of the parking gear released to prevent the parking gear from being locked even by a decrease in the hydraulic pressure (see, for example, Japanese Unexamined Patent Application Publication (Translation of PCT Application) (JP-T) No. 2009-520163).

The locking device disclosed in JP-T No. 2009-520163 includes a piston unit axially movable in a housing and lockable at a predetermined position in an axial direction, and a latch mechanism that automatically operates at the lock position of the piston unit to hold the piston unit. The latch mechanism includes a spring arm driven by an electromagnetic solenoid and coupled to the piston unit at the lock position of the piston unit. The spring arm is driven by the electromagnetic solenoid to come into contact with an engagement area of the piston unit at the lock position.

SUMMARY

An aspect of the disclosure provides a parking lock device including a parking mechanism, a lock state switching member, a lock-released state keeper, a selector, a vehicle speed detector, a switching controller, and a keeping controller. The parking mechanism includes a parking gear, and a parking pawl configured to engage with the parking gear to lock the parking gear to change an automatic transmission into a parking state. The lock state switching member is configured to lock the parking gear when supply of hydraulic pressure is stopped. The lock state switching member is configured to, when hydraulic pressure is supplied, release lock of the parking gear by driving the parking pawl with pressing force generated by the hydraulic pressure. The lock-released state keeper is configured to, when powered, keep the lock state switching member releasing the lock of the parking gear. The lock-released state keeper is configured to, when unpowered, stop keeping the lock state switching member releasing the lock of the parking gear. The selector is configured to receive operation to select a shift range of the automatic transmission. The vehicle speed detector is configured to detect a speed of a vehicle. The switching controller is configured to, when a parking range is selected, stop supplying the hydraulic pressure to the lock state switching member. The switching controller is configured to, when any of shift ranges other than the parking range is selected, supply the hydraulic pressure to the lock state switching member. The keeping controller is configured to, when any of the shift ranges other than the parking range is selected and the vehicle speed is equal to or higher than a predetermined speed, supply power to the lock-released state keeper to keep the lock of the parking gear released. The keeping controller is configured to, when any of the shift ranges other than the parking range is selected and when the vehicle speed is lower than the predetermined speed, stop supplying the power to the lock-released state keeper to stop keeping the lock of the parking gear released.

An aspect of the disclosure provides a parking lock device including a parking mechanism, a lock state switching member, a lock-released state keeper, a selector, a vehicle speed detector, and circuitry. The parking mechanism includes a parking gear, and a parking pawl configured to engage with the parking gear to lock the parking gear to change an automatic transmission into a parking state. The lock state switching member is configured to lock the parking gear when supply of hydraulic pressure is stopped. The lock state switching member is configured to, when hydraulic pressure is supplied, release lock of the parking gear by driving the parking pawl with pressing force generated by the hydraulic pressure. The lock-released state keeper is configured to, when powered, keep the lock state switching member releasing the lock of the parking gear. The lock-released state keeper is configured to, when unpowered, stop keeping the lock state switching member releasing the lock of the parking gear. The selector is configured to receive operation to select a shift range of the automatic transmission. The vehicle speed detector is configured to detect a speed of a vehicle. The circuitry is configured to, when a parking range is selected, stop supplying the hydraulic pressure to the lock state switching member. The circuitry is configured to, when any of shift ranges other than the parking range is selected, supply the hydraulic pressure to the lock state switching member. The circuitry is configured to, when any of the shift ranges other than the parking range is selected and the vehicle speed is equal to or higher than a predetermined speed, supply power to the lock-released state keeper to keep the lock of the parking gear released. The circuitry is configured to, when any of the shift ranges other than the parking range is selected and when the vehicle speed is lower than the predetermined speed, stop supplying the power to the lock-released state keeper to stop keeping the lock of the parking gear released.

BRIEF DESCRIPTION OF THE DRAWINGS

The accompanying drawings are included to provide a further understanding of the disclosure and are incorporated in and constitute a part of this specification. The drawings

DETAILED DESCRIPTION

Figure 1:
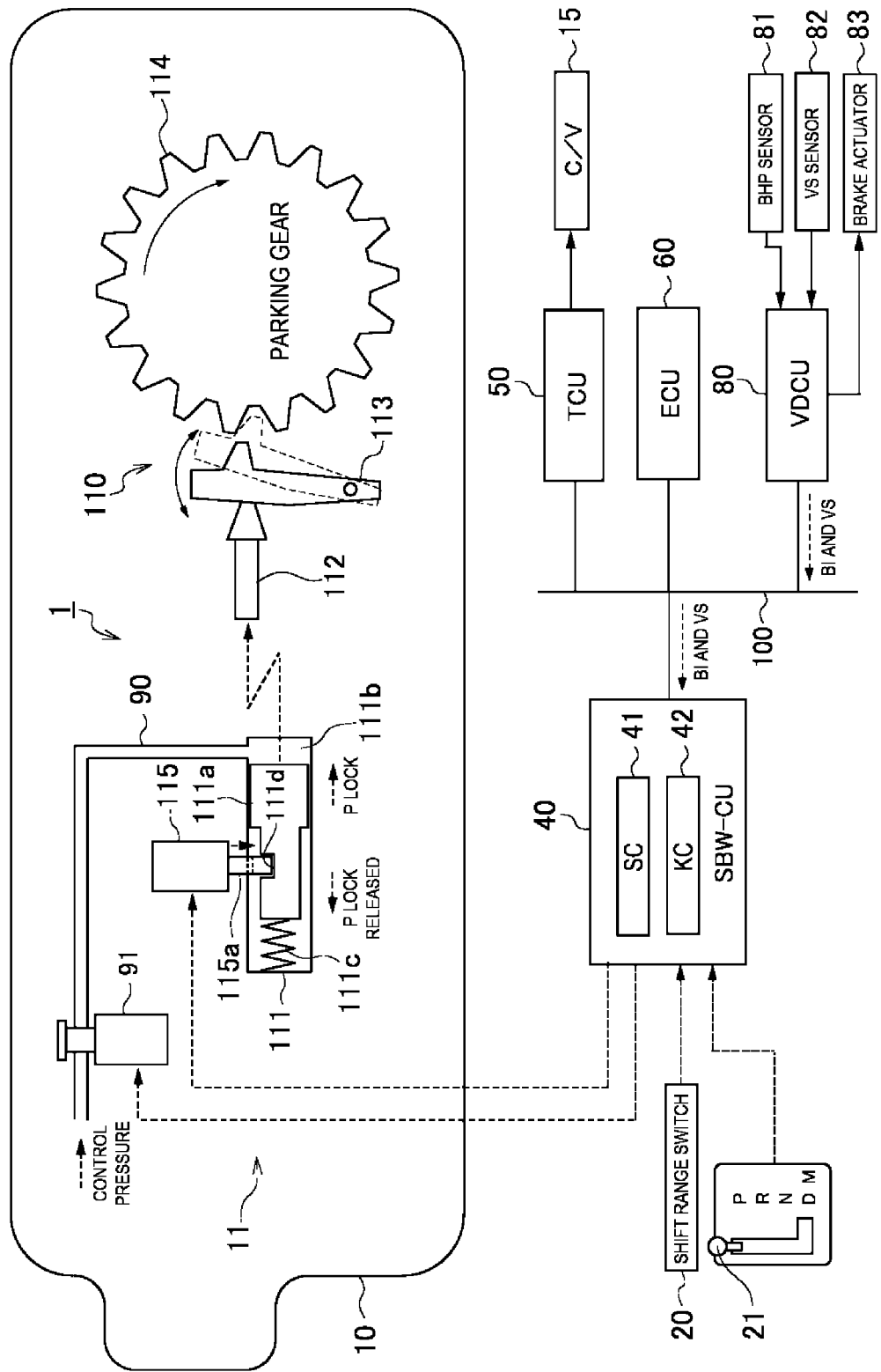
FIG. 1 is a block diagram illustrating the configuration of a parking lock device according to an embodiment.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Referring now to the drawings, a preferred embodiment of the disclosure will be described in detail. In the drawings, the same or corresponding portions are denoted by the same reference numerals. In the respective drawings, the same elements are designated by the same reference numerals and overlapping description will be omitted.

With the locking device disclosed in JP-T No. 2009-520163, while the supplied hydraulic pressure is releasing lock of the parking gear, the latch mechanism to hold the piston unit is driven (that is, the electromagnetic solenoid is driven) to prevent the parking gear from being locked even though the driver has no intention.

In this locking device, however, while lock of the parking gear is being released, it is necessary to constantly supply power to the electromagnetic solenoid to drive the latch mechanism, thereby unfortunately increasing power consumption (and degrading fuel economy in consequence).

It is desirable to provide a parking lock device capable of preventing a parking gear from being locked even though a driver has no intention and reducing power consumed by keeping the parking gear unlocked.

Referring first to FIG. 1, the configuration of a parking lock device 1 according to the embodiment will be described. FIG. 1 is a block diagram illustrating the configuration of the parking lock device 1.

An automatic transmission 10 to which the parking lock device 1 is applied includes, for example, a torque converter having a lock-up clutch function and a torque amplifying function, and a transmission unit with a transmission gear train and a control valve (an example of a hydraulic pressure mechanism). Examples of the automatic transmission 10 include a stepped automatic transmission and a continuously variable transmission (CVT) capable of automatic gear change using the control valve. In the present embodiment, the automatic transmission 10 includes the CVT. The automatic transmission 10 is coupled to the output shaft of an engine (not illustrated), and converts and outputs driving force from the engine.

The automatic transmission 10 includes a hydraulic shift-by-wire actuator (hereinafter referred to as an "SBW actuator") 11. Drive of the SBW actuator 11 is controlled by a shift-by-wire control unit (hereinafter referred to as an "SBW-CU") 40. The SBW actuator 11 controls hydraulic pressure in accordance with a control signal (a drive signal) from the SBW-CU 40 so as to switch a shift range of the automatic transmission 10.

At a center console of a vehicle, for example, a shift lever 21 is provided. The shift lever 21 receives shift operation (operation to select a shift range of the automatic transmission 10) by a driver. The shift lever 21 includes a shift range switch 20 coupled to the shift lever 21 and movable in conjunction with the shift lever 21. The shift range switch 20 detects a selected position of the shift lever 21 and output selection information in accordance with the selected position. The shift range switch 20 is connected with the SBW-CU 40 (or may be connected with a TCU 50 which will be described later) in such a manner that the SBW-CU 40 reads the selected position of the shift lever 21 (the selection information) that has been detected. The SBW-CU 40 switches a shift range of the automatic transmission 10 based on the selection information. It should be noted that the shift lever 21 is capable of selectively switching, for example, among four shift ranges, that is, a parking range (a P range), a backward travel range (a reverse (R) range), a neutral range (an N range), and a forward travel range (a drive (D) range). In one embodiment, the shift lever 21 and the shift switch 20 may serve as a "selector".

The automatic transmission 10 also includes a parking mechanism 110 that locks rotation inside the automatic transmission 10 so that the wheels do not rotate when the P range is selected. The parking mechanism 110 includes a parking gear 114 and a parking pawl 113. The parking pawl 113 engages with the parking gear 114 to lock the parking gear 114 and brings the automatic transmission 10 into a parking state.

More specifically, a parking rod 112 is axially movably coupled to an output shaft of a parking piston 111 that constitutes the SBW actuator 11 driven by the SBW-CU 40. The parking gear 114 is spline-fitted to an output shaft of the automatic transmission 10. The parking pawl 113 is swingable to engage with the parking gear 114.

When the P range is selected, a piston 111a of the parking piston 111 is displaced to the right in FIG. 1 to make the parking rod 112 advance axially. Then, the parking pawl 113 is pressed from behind by the parking rod 112 and swings to engage with the parking gear 114. Thus, rotation of the automatic transmission 10 is locked.

An oil passage 90 through which oil is supplied is coupled to an end of the parking piston 111. The parking piston 111 accommodates the piston (a spool valve) 111a axially slidable inside. A spring 111c is disposed on another end of the piston 111a. The piston 111a is driven axially in accordance with balance between pressing force generated by hydraulic pressure (hydraulic pressure multiplied by a pressure-receiving area) and spring force (urging force) of the spring 111c. As a result, the parking rod 112 and the parking pawl 113 are driven.

In the parking piston 111, when the spring force of the spring 111c is larger than the pressing force generated by the hydraulic pressure in an oil chamber 111b (that is, when supply of the hydraulic pressure is stopped), the piston 111a is displaced (slid) to the right in FIG. 1 to swing the parking pawl 113 to lock the parking gear 114. Consequently, when supply of the hydraulic pressure to the parking piston 111 is stopped, the parking pawl 113 is driven (swung) to lock the parking gear 114 (that is, bring the automatic transmission 10 into the parking state).

In the parking piston 111, when the spring force of the spring 111c is less than the pressing force generated by the hydraulic pressure in the oil chamber 111b (that is, when the hydraulic pressure is supplied), the piston 111a is displaced (slid) to the left in FIG. 1 to swing the parking pawl 113 to release lock of the parking gear 114. Thus, when the hydraulic pressure is supplied to the parking piston 111, driving (swinging) of the parking pawl 113 is stopped to release lock of the parking gear 114 (that is, bring the automatic transmission 10 into a non-parking state). In one embodiment, the parking piston 111 may serve as a "lock state switching member".

An electromagnetic valve 91 is disposed in the oil passage 90 to open and close the oil passage 90 to supply or stop supplying the hydraulic pressure (the oil) to the parking piston 111. The electromagnetic valve 91 is connected to the SBW-CU 40, and drive of the electromagnetic valve 91 is controlled by the SBW-CU 40. That is, the SBW-CU 40 controls opening and closing of the electromagnetic valve 91 to supply the hydraulic pressure to the parking piston 111 or stop supplying the hydraulic pressure to the parking piston 111.

The piston 111a that constitutes the parking piston 111 described above has an outer circumferential surface formed with a recess 111d (such as a hole or a groove). For example, the recess 111 extends in a direction substantially perpendicular to the axial direction. The recess 111d (such as a hole or a groove) is formed in the piston 111a so that a plunger 115a of a lock-released state keeping solenoid 115 (which will be described later) can fit in the recess 111d to lock the piston 111a (that is, restrict movement of the piston 111a) while the hydraulic pressure is supplied to the parking piston 111 (that is, while lock of the parking gear 114 is released).

The lock-released state keeping solenoid (lock solenoid) 115 is, for example, an electromagnetic solenoid. When power is supplied to the lock-released state keeping solenoid 115, the plunger (a movable core) 115a protrudes to fit in the recess 111d (such as a hole or a groove) of the piston 111a. When no power is supplied to the lock-released state keeping solenoid 115, the plunger 115a is retracted to release engagement with the piston 111a. That is, when powered, the lock-released state keeping solenoid 115 keeps the parking piston 111 (the piston 111a) releasing the lock of the parking gear 114 (that is, keeps the non-parking state). When unpowered, the lock-released state keeping solenoid 115 stops keeping the parking piston 111 releasing the lock of the parking gear 114 (that is, brings the parking piston 111 into a non-keeping state). In one embodiment, the lock-released state keeping solenoid 115 may serve as a "lock-released state keeper".

As described above, the SBW-CU 40 is connected to the SBW actuator 11. Via a CAN 100, the SBW-CU 40 is in communicable connect to elements such as a transmission control unit (hereinafter referred to as a "TCU") 50, an engine control unit (hereinafter referred to as an "ECU") 60, and a vehicle dynamic control unit (hereinafter referred to as a "VDCU") 80.

Each of the control units will now be described. First, the TCU 50 controls gear change of the automatic transmission 10. Various sensors disposed in the automatic transmission 10 are connected to the TCU 50. Via the CAN 100, the TCU 50 receives information such as an engine speed and an opening degree of an accelerator pedal transmitted from the ECU 60, and information such as a shift range of the automatic transmission 10 transmitted from the SBW-CU 40.

Based on the obtained various information including the engine speed, the opening degree of the accelerator pedal, a vehicle speed, and the shift range, the TCU 50 drives a solenoid valve that constitutes the control valve 15 so as to perform gear change control of the automatic transmission 10 and the like. The control valve 15 controls hydraulic pressure for gear change of the automatic transmission 10. More specifically, the control valve 15 uses a spool valve and a solenoid valve (an electromagnetic valve) to move the spool valve so as to open and close an oil passage to supply hydraulic pressure generated by an oil pump to, for example, a drive pulley and a driven pulley. It should be noted that the TCU 50 transmits various information on the automatic transmission 10 to the SBW-CU 40 via the CAN 100.

Connected with the VDCU 80 are a brake hydraulic pressure sensor 81 (which may be referred to as a "BHP sensor 81") that detects master cylinder pressure of a brake actuator 83 and a vehicle speed sensor 82 (which may be referred to as a "VS sensor 82") that detects a speed of the vehicle (a vehicle speed). In one embodiment, the brake hydraulic pressure sensor 81 may serve as a "braking operation detector", and the vehicle speed sensor 82 may serve as a "vehicle speed detector". The VDCU 80 drives the brake actuator 83 in accordance with an operation amount of a brake pedal to brake the vehicle, and detects vehicle behavior using various sensors (for example, the vehicle speed sensor 82, a steering angle sensor, an acceleration sensor, and a yaw rate sensor) so that brake control by automatic pressurization and torque control of the engine prevent the vehicle from skidding to secure vehicle stability in turning. The VDCU 80 transmits information including braking information (braking operation information) and vehicle speed information to the SBW-CU 40 via the CAN 100.

Based on the shift range detected by the shift range switch 20, the braking operation information and the vehicle speed information received from the VDCU 80, and various input information received from the TCU 50, the SBW-CU 40 generates and outputs a control signal and drives the SBW actuator 11 to switch a shift range of the automatic transmission 10. The SBW-CU 40 has a function of preventing the parking gear 114 from being locked even though the driver has no intention and reducing power that is consumed to keep the parking gear 114 unlocked.

Therefore, the SBW-CU 40 functionally includes a switching controller 41 and a keeping controller 42. The switching controller 41 may be referred to as an "SC 41", and the keeping controller 42 may be referred to as a "KC 42". The SBW-CU 40 includes a microprocessor that executes calculation, an EEPROM that stores programs and the like to cause the microprocessor to execute various processing, a RAM that stores various data such as results of calculation, a backup RAM that retains stored contents by a battery, and an input/output I/F including, for example, a driver circuit that drives the electromagnetic valve 91 and the lock-released state keeping solenoid 115. In the SBW-CU 40, the microprocessor executes programs stored in elements such as the EEPROM to implement functions of the switching controller 41 and the keeping controller 42.

Based on the selected shift range, the switching controller 41 controls the supply of hydraulic pressure to the parking piston 111 (that is, controls whether to supply pressure to the parking piston 111). More specifically, when any of the shift ranges other than the P range is selected (when selection information is output), the switching controller 41 opens the electromagnetic valve 91 to supply hydraulic pressure to the parking piston 111. When the P range is selected (when selection information is output), the switching controller 41 closes the electromagnetic valve 91 to stop supplying the hydraulic pressure to the parking piston 111. That is, in one embodiment, the switching controller 41 may serve as a "switching controller".

The keeping controller 42 controls operation of the lock-released state keeping solenoid 115 based on the selected shift range, the vehicle speed, and the braking operation information (brake information). The brake information may be referred to as "BI", and the vehicle speed may be referred to as "VS". That is, in one embodiment, the keeping controller 42 may serve as a "keeping controller".

More specifically, when any of the shift ranges other than the P range is selected (when the selection information is output) and when the vehicle speed is equal to or higher than a predetermined speed (for example, approximately zero km/h) or when any of the shift ranges other than the P range is selected (when the selection information is output), when the vehicle speed is lower than the predetermined speed, and when the braking operation (the brake operation) is not performed, the keeping controller 42 supplies power to the lock-released state keeping solenoid 115 to keep the lock of the parking gear 114 released (keep the non-parking state).

When any of the shift ranges other than the P range is selected (when the selection information is output), when the vehicle speed is lower than the predetermined speed, and when the braking operation (the brake operation) is being performed, the keeping controller 42 stops supplying power to the lock-released state keeping solenoid 115 to stop keeping the lock of the parking gear 114 released (stops keeping the non-parking state).

It should be noted that when any of the shift ranges other than the P range is selected and when the vehicle speed is equal to or higher than the predetermined speed (for example, approximately zero km/h), the keeping controller 42 may supply power to the lock-released state keeping solenoid 115 to keep the lock of the parking gear 114 released, and when any of the shift ranges other than the P range is selected and when the vehicle speed is lower than the predetermined speed, the keeping controller 42 may stop supplying power to the lock-released state keeping solenoid 115 to stop keeping the lock of the parking gear 114 released.

Figure 2:
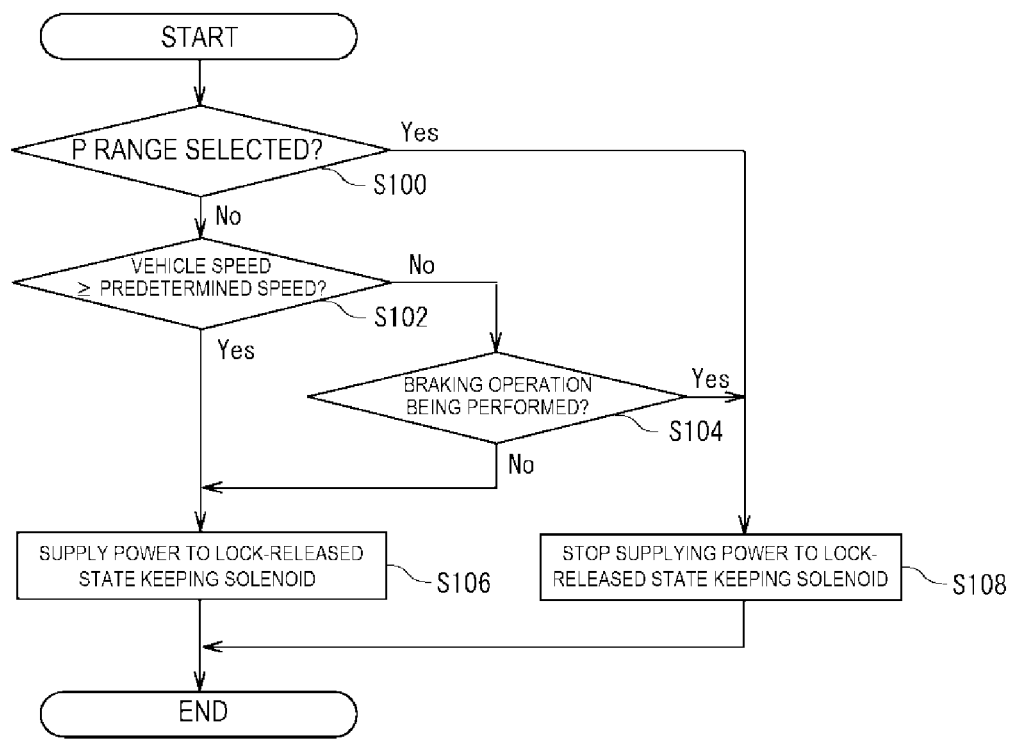
FIG. 2 is a flowchart of a procedure of parking lock processing performed by the parking lock device according to the embodiment.

Referring now to FIG. 2, operation of the parking lock device 1 will be described. FIG. 2 is a flowchart of a procedure of parking lock processing performed by the parking lock device 1. This processing is repeatedly executed by the SBW-CU 40 in a predetermined cycle (for example, every 10 ms).

At step S100, a determination is made as to whether the P range is selected (as a shift range of the automatic transmission 10). When the P range is selected, the processing proceeds to step S108. When the P range is not selected (that is, when any of the shift ranges other than the P range is selected), the processing proceeds to step S102.

At step S102, a determination is made as to whether the vehicle speed is equal to or higher than the predetermined speed (for example, approximately zero km/m). When the vehicle speed is equal to or higher than the predetermined speed, the processing proceeds to step S106. When the vehicle speed is lower than the predetermined speed, the processing proceeds to step S104.

At step S104, a determination is made as to whether the braking operation (the brake operation) is being performed. When the braking operation is being performed, the processing proceeds to step S108. When the braking operation is not performed, the processing proceeds to step S106.

When the P range is not selected and when the vehicle speed is equal to or higher than the predetermined speed or when the P range is not selected, when the vehicle speed is lower than the predetermined speed, and when the braking operation (the brake operation) is not performed, power is supplied to the lock-released state keeping solenoid 115 (that is, movement of the piston 111a is restricted) to keep the lock of the parking gear 114 released at step S106. After that, this processing ends once.

When the P range is selected or when the P range is not selected, when the vehicle speed is lower than the predetermined speed, and when the braking operation (the brake operation) is being performed, power supply to the lock-released state keeping solenoid 115 is stopped to stop keeping the lock of the parking gear 114 released at step S108. After that, this processing ends once.

According to the embodiment, as described above, when the P range is selected, supply of hydraulic pressure to the parking piston 111 is stopped. When any of the shift ranges other than the P range is selected, hydraulic pressure is supplied to the parking piston 111. When any of the shift ranges other than the P range is selected and when the vehicle speed is equal to or higher than the predetermined speed or when any of the shift ranges other than the P range is selected, when the vehicle speed is lower than the predetermined speed, and when the braking operation is not performed, power is supplied to the lock-released state keeping solenoid 115 to keep the lock of the parking gear 114 released. Consequently, in a situation where the driver's traveling intention is presumed, the parking gear 114 is prevented from being locked unintentionally. While the vehicle is during a stop to wait at traffic lights, for example, no disadvantageous situation arises even when the hydraulic pressure escapes to lock the parking gear 114. In view of this, with the parking lock device 1 according to the embodiment, when any of the shift ranges other than the P range is selected and when the vehicle speed is lower than the predetermined speed, power supply to the lock-released state keeping solenoid 115 is stopped to stop keeping the lock of the parking gear 114 released. This reduces power consumption. As a result, the parking gear 114 can be prevented from being locked even though the driver has no intention, and power that is consumed to keep the parking gear 114 unlocked can be reduced.

When any of the shift ranges other than the P range is selected and when the vehicle speed is equal to or higher than the predetermined speed or when any of the shift ranges other than the P range is selected, when the vehicle speed is lower than the predetermined speed, and when the braking operation is not performed, power is supplied to the lock-released state keeping solenoid 115 to keep the lock of the parking gear 114 released. Consequently, in a situation where the driver's traveling intention is presumed, the parking gear 114 is prevented from being locked unintentionally. When the vehicle is at a low speed (e.g., during a stop or at such an extremely low speed as creeping), for example, and when the braking operation is being performed, it can be presumed that the driver is intending to stop the vehicle. Therefore, even when the hydraulic pressure escapes to lock the parking gear 114, no abrupt deceleration occurs to deteriorate safety. In view of this, when any of the shift ranges other than the P range is selected, when the vehicle speed is lower than the predetermined speed, and when the braking operation is being performed, power supply to the lock-released state keeping solenoid 115 is stopped to stop keeping the lock of the parking gear 114 released. This reduces power consumption. As a result, the parking gear 114 can be prevented from being locked even though the driver has no intention, and power that is consumed to keep the parking gear 114 unlocked can be reduced.

According to the embodiment, when power is supplied to the lock-released state keeping solenoid 115, the plunger 115a protrudes outward to fit in the recess 111d (such as a hole or a groove) of the piston 111a. This makes it possible to reliably keep the lock of the parking gear 114 released.

Moreover, according to the embodiment, the parking piston 111 includes the oil chamber 111b disposed on one end of the piston 111a, and the spring 111c disposed on the other end of the piston 111a. The piston 111a is axially displaced in accordance with the balance between the pressing force generated by the hydraulic pressure supplied to the oil chamber 111b and the urging force of the spring 111c so as to switch a lock state of the parking gear 114. Consequently, the lock state of the parking gear 114 can be appropriately switched.

The embodiment of the disclosure has been described thus far. It should be noted that the disclosure is not limited to the examples described above. Various modifications may be made. For example, a system configuration of the example is merely an example and should not be construed to limit the disclosure. For instance, the SBW-CU 40 and the SBW actuator 11 may be permanently affixed to each other. The SBW-CU 40 and the TCU 50 may be provided as a single unit.

The configuration (the structure) to keep the parking gear 114 unlocked (keep the non-parking state) is not limited to the configuration described in the above example, that is, the configuration in which the plunger 115a protrudes when powered to fit in the recess 111d (such as a hole or a groove) of the piston 111a.

Furthermore, making a determination as to the braking operation condition (step S104) described in the example may be omitted. That is, when a result of the determination at step S102 is negative, the processing may proceed to step S108.

According to the example of the disclosure, the parking gear can be prevented from being locked even though the driver has no intention, and power consumed by keeping the parking gear unlocked can be reduced.

The invention claimed is:
1. A parking lock device comprising:
a parking mechanism comprising
a parking gear, and
a parking pawl configured to engage with the parking gear to lock the parking gear to change an automatic transmission into a parking state;
a lock state switching member configured to lock the parking gear when supply of hydraulic pressure is stopped, the lock state switching member being configured to, when hydraulic pressure is supplied, release lock of the parking gear by driving the parking pawl with pressing force generated by the hydraulic pressure;
a lock-released state keeper configured to,
when powered, keep the lock state switching member releasing the lock of the parking gear, and
when unpowered, stop keeping the lock state switching member releasing the lock of the parking gear;
a selector configured to receive operation to select a shift range of the automatic transmission;

a vehicle speed detector configured to detect a speed of a vehicle;
a switching controller configured to, when a parking range is selected, stop supplying the hydraulic pressure to the lock state switching member, and when any of shift ranges other than the parking range is selected, supply the hydraulic pressure to the lock state switching member; and
a keeping controller configured to,
when any of the shift ranges other than the parking range is selected and the vehicle speed is equal to or higher than a predetermined speed, supply power to the lock-released state keeper to keep the lock of the parking gear released, and
when any of the shift ranges other than the parking range is selected and the vehicle speed is lower than the predetermined speed, stop supplying the power to the lock-released state keeper to stop keeping the lock of the parking gear released; and
a braking operation detector configured to detect braking operation of the vehicle, wherein the keeping controller is configured to,
(i) when any of the shift ranges other than the parking range is selected and the vehicle speed is equal to or higher than the predetermined speed, or (ii) when any of the shift ranges other than the parking range is selected, the vehicle speed is lower than the predetermined speed, and the braking operation is not detected, supply the power to the lock-released state keeper to keep the lock of the parking gear released, and
when any of the shift ranges other than the parking range is selected, the vehicle speed is lower than the predetermined speed, and the braking operation is being detected, stop supplying the power to the lock-released state keeper to stop keeping the lock of the parking gear released.

2. The parking lock device according to claim 1, wherein
the lock state switching member comprises a piston axially movable, the piston comprising an outer circumferential surface formed with a recess, and
the lock-released state keeper comprises an electromagnetic solenoid comprising a plunger configured to protrude outward when powered, to fit in the recess of the piston.

3. The parking lock device according to claim 2, wherein
the lock state switching member comprises
an oil chamber disposed on one end of the piston, and
a spring disposed on another end of the piston, and
the lock state switching member is configured to switch a lock state of the parking gear by making the piston axially move in accordance with balance between pressing force generated by hydraulic pressure supplied to the oil chamber and urging force of the spring.

4. The parking lock device according to claim 1, wherein
the lock state switching member comprises a piston axially movable, the piston comprising an outer circumferential surface formed with a recess, and
the lock-released state keeper comprises an electromagnetic solenoid comprising a plunger configured to protrude outward when powered, to fit in the recess of the piston.

5. The parking lock device according to claim 4, wherein
the lock state switching member comprises
an oil chamber disposed on one end of the piston, and
a spring disposed on another end of the piston, and
the lock state switching member is configured to switch a lock state of the parking gear by making the piston axially move in accordance with balance between pressing force generated by hydraulic pressure supplied to the oil chamber and urging force of the spring.

6. A parking lock device comprising:

a parking mechanism comprising
- a parking gear, and
- a parking pawl configured to engage with the parking gear to lock the parking gear to change an automatic transmission into a parking state;

a lock state switching member configured to lock the parking gear when supply of hydraulic pressure is stopped, the lock state switching member being configured to, when hydraulic pressure is supplied, release lock of the parking gear by driving the parking pawl with pressing force generated by the hydraulic pressure;

a lock-released state keeper configured to,
- when powered, keep the lock state switching member releasing the lock of the parking gear, and
- when unpowered, stop keeping the lock state switching member releasing the lock of the parking gear;

a selector configured to receive operation to select a shift range of the automatic transmission;

a vehicle speed detector configured to detect a speed of a vehicle;

circuitry configured to
- when a parking range is selected, stop supplying the hydraulic pressure to the lock state switching member, and when any of shift ranges other than the parking range is selected, supply the hydraulic pressure to the lock state switching member,
- when any of the shift ranges other than the parking range is selected and the vehicle speed is equal to or higher than a predetermined speed, supply power to the lock-released state keeper to keep the lock of the parking gear released, and
- when any of the shift ranges other than the parking range is selected and the vehicle speed is lower than the predetermined speed, stop supplying the power to the lock-released state keeper to stop keeping the lock of the parking gear released; and a braking operation detector configured to detect braking operation of the vehicle, wherein the circuitry is configured to,
- (i) when any of the shift ranges other than the parking range is selected and the vehicle speed is equal to or higher than the predetermined speed, or (ii) when any of the shift ranges other than the parking range is selected, the vehicle speed is lower than the predetermined speed, and the braking operation is not detected, supply the power to the lock-released state keeper to keep the lock of the parking gear released, and
- when any of the shift ranges other than the parking range is selected, the vehicle speed is lower than the predetermined speed, and the braking operation is being detected, stop supplying the power to the lock-released state keeper to stop keeping the lock of the parking gear released.

* * * * *